(12) United States Patent
Nakashima et al.

(10) Patent No.: US 8,076,446 B2
(45) Date of Patent: Dec. 13, 2011

(54) OPTICAL LAYERED BODY AND METHOD FOR PRODUCING OPTICAL LAYERED BODY

(75) Inventors: Masataka Nakashima, Tokyo (JP); Yoko Kinoshita, Tokyo (JP); Kiyoshi Itoh, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 599 days.

(21) Appl. No.: 12/295,025

(22) PCT Filed: Mar. 30, 2007

(86) PCT No.: PCT/JP2007/057188
§ 371 (c)(1), (2), (4) Date: Nov. 20, 2008

(87) PCT Pub. No.: WO2007/114364
PCT Pub. Date: Oct. 11, 2007

(65) Prior Publication Data
US 2009/0280317 A1    Nov. 12, 2009

(30) Foreign Application Priority Data

Mar. 31, 2006 (JP) .................. 2006-100961
Apr. 27, 2006 (JP) .................. 2006-123912

(51) Int. Cl.
*C08G 64/00* (2006.01)
*C08G 63/02* (2006.01)

(52) U.S. Cl. ........... 528/176; 106/170.2; 106/287.13; 359/109; 359/642; 428/411.1; 428/412; 528/26

(58) Field of Classification Search ....... 106/170–170.2, 106/287.13; 359/109, 642; 428/411.1, 412; 528/176, 26
See application file for complete search history.

(56) References Cited

U.S. PATENT DOCUMENTS 7,323,530 B2 * 1/2008 Okubo et al. ............ 528/26

FOREIGN PATENT DOCUMENTS

| JP | 2004099639 | 4/2004 |
| JP | 2005231089 | 9/2005 |
| JP | 2005241989 | 9/2005 |
| JP | 2005305844 | 11/2005 |
| JP | 2006051781 | 2/2006 |

* cited by examiner

*Primary Examiner* — Terressa Boykin
(74) *Attorney, Agent, or Firm* — Connolly Bove Lodge & Hutz LLP

(57) ABSTRACT

An optical layered body having an excellent antistatic property and adhesion is provided. An optical layered body is provided that comprises an antistatic layer and a hard coat layer formed in sequence on a light transmitting substrate, wherein in the cross-sectional appearance of the layered body, the cross-section phase of the hard coat layer exists in the region of the light transmitting substrate via the antistatic layer from the hard coat layer.

15 Claims, 2 Drawing Sheets

DRAWINGS 0.1 μm

OPTICAL LAYERED BODY AND METHOD FOR PRODUCING OPTICAL LAYERED BODY

CROSS REFERENCE TO RELATED APPLICATIONS

Figure 1:
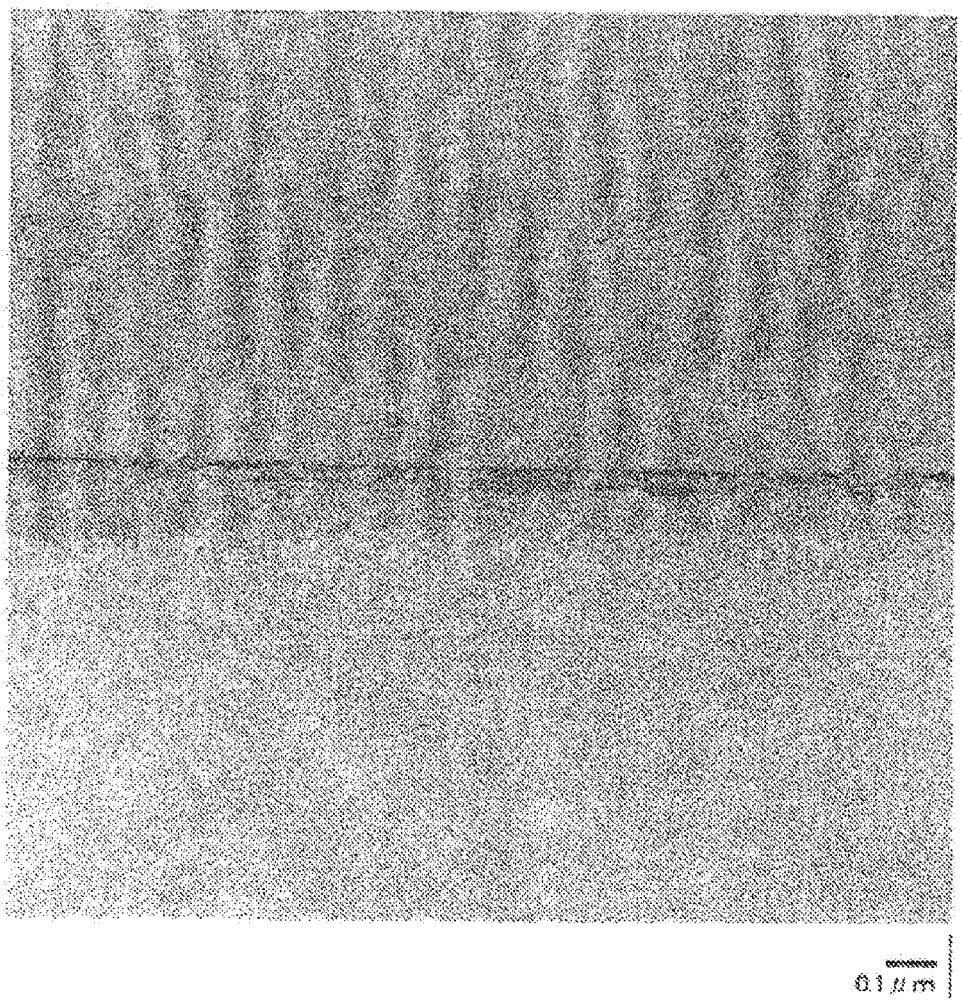

This application is a national phase of PCT/JP2007/057188, filed on Mar. 30, 2007, which claims priority to JP2006-100961, filed on Mar. 31, 2006, and JP 2006-123912, filed on Apr. 27, 2006, the entire contents of which are incorporated herein by reference in their entireties.

TECHNICAL FIELD

The present invention relates to a novel optical layered body and a method for producing the optical layered body.

BACKGROUND ART

Since molded bodies of optical elements composing various display devices represented by displays of electronic appliances such as word processors, computers and televisions are made of plastics and glass showing insulating property, there are problems of electrification and adherence of dust. For example, optical devices made of plastics such as antireflection sheets composing display devices cause a bad effect on image display functions of display devices if electrification and adherence of dust occur in the processing process or assembly process of a display device. Further, in IPS "in-plane switching" mode or VA "domain vertical alignment" mode in LCD, disorder of image sometimes occurs due to electrification of surface films.

Therefore, in order to prevent the above-mentioned problems, methods for forming an antistatic layer on transparent materials are proposed. Antistatic layers are, in general, formed from compositions containing antistatic agents and binders of ultraviolet curable resins (Patent Documents 1 to 3).

In this case, in order to heighten the antistatic property, if a large amount of antistatic agents are added, the content of the binder is relatively lowered to cause a problem that the interlayer strength (adhesion) between the antistatic layer and its neighboring layer or the film strength is decreased. When the adhesion or film strength is decreased, separation occurs from the antistatic layer. Such separation cause various troubles in the production process and also reduction in the product value. On the other hand, in order to increase the adhesion or film strength, if the content of the resin binder is increased, the content of the antistatic agent is relatively lowered to decrease the antistatic property.

Patent Document 1: Japanese Kokai Publication 2005-305844
Patent Document 2: Japanese Kokai Publication 2005-231089
Patent Document 3: Japanese Kokai Publication 2005-241989

DISCLOSURE OF THE INVENTION

Problems to be Solved by the Invention

Accordingly, it is a main object of the present invention to provide an optical layered body having excellent antistatic property and adhesion, and a method for producing the same.

Means for Solving the Problems

In view of the problems of the conventional technique, the present inventors made earnest investigations and found that the above-mentioned object can be accomplished by employing a specified layer configuration. These findings have led to completion of the present invention.

The present invention relates to an optical layered body comprising an antistatic layer and a hard coat layer formed in sequence on a light transmitting substrate, wherein in the cross-sectional appearance of the layered body, the cross-section phase of the hard coat layer exists in the region of the light transmitting substrate via the antistatic layer from the hard coat layer.

Preferably, the antistatic layer is formed from a heat drying composition containing an antistatic agent and a thermoplastic resin.

Preferably, the antistatic agent is at least one conductive polymer selected from polyacetylene, polyaniline, polythiophene, polypyrrole, polyphenylene sulfide, poly(1,6-heptadiine), polybiphenylene (poly-p-phenylene), poly-p-phenylene sulfide, polyphenylacetylene, poly(2,5-thienylene), polyfuran, poly(3,4-ethylenedioxythiophene), polyisothianaphthene, polyacene, and their derivatives.

Preferably, the thickness of the antistatic layer is 10 to 500 nm.

Preferably, the hard coat layer is formed from a composition for hard coat layers containing a resin and a solvent, and the solvent has solubility for the thermoplastic resin of the antistatic layer.

Preferably, the optical layered body has substantially no interference fringe.

Preferably, in the optical layered body, at least one layer selected from the group consisting of an antiglare layer, a low Refractive index layer and an antifouling layer is formed on the hard coat layer.

Preferably, in the optical layered body, at least one layer among the hard coat layer and layers selected from the group consisting of the antiglare layer, low refractive index layer, and antifouling layer has an antistatic property.

The optical layered body is preferably used as an antireflection layered body.

The present invention also relates to a polarizer comprising a polarizing element, wherein the polarizer includes the above-mentioned optical layered body on a surface of the polarizing element.

Preferably, the polarizer comprises an antistatic layer other than the antistatic layer included in the optical layered body.

The present invention also relates to a method for producing an optical layered body comprising an antistatic layer and a hard coat layer formed in sequence on a light transmitting substrate, wherein the antistatic layer is formed from a heat drying composition containing an antistatic agent and a thermoplastic resin; the hard coat layer is formed from a composition for hard coat layers containing a resin and a solvent; and the solvent has solubility for the thermoplastic resin of the antistatic layer.

With respect to the optical layered body of the present invention, in the cross-sectional appearance of the layered body, since the cross-section phase of the hard coat layer exists in the region of the light transmitting substrate via the antistatic layer from the hard coat layer, excellent adhesion can be exhibited. That is, the optical layered body of the present invention maintains the state of united formation of the substrate/antistatic layer/hard coat layer. Therefore, while the good adhesion is maintained, an antistatic agent in an amount equal to or more than that in the conventional technique can be used and as a result, the better antistatic property can be exhibited.

In particular, in the case where an organic antistatic agent (polythiophene, polyaniline or polypyrrole) is used as an antistatic agent, it is made possible to exhibit excellent antistatic property and at the same time heighten the total light transmittance and lower the haze value. In particular, polythiophene is preferable because of the high transparency.

The optical layered body of the present invention is suitably used as a hard coat layered body, preferably a antireflection layered body (including use as an antiglare layered body). The optical layered body of the present invention is also usable for transmission type display devices. It is particularly usable for displays of televisions, computers and word processors, and particularly preferably usable for surfaces of displays of CRT, ELD, PDP, liquid crystal panels, and the like.

The optical layered body of the present invention is a layered body including an antistatic layer and a hard coat layer in sequence on a light transmitting substrate and characterized in that in the cross-sectional appearance of the layered body, the cross-section phase of the hard coat layer exists in the region of the light transmitting substrate via the antistatic layer from the hard coat layer. Since the hard coat layer has high hardness, when the optical layered body is cut out, some sort of cutting trace shape, whatsoever it is, remains. That is, the cross-section phase of the hard coat means such patterns in the cross-section of the hard coat layer.

Figure 2:
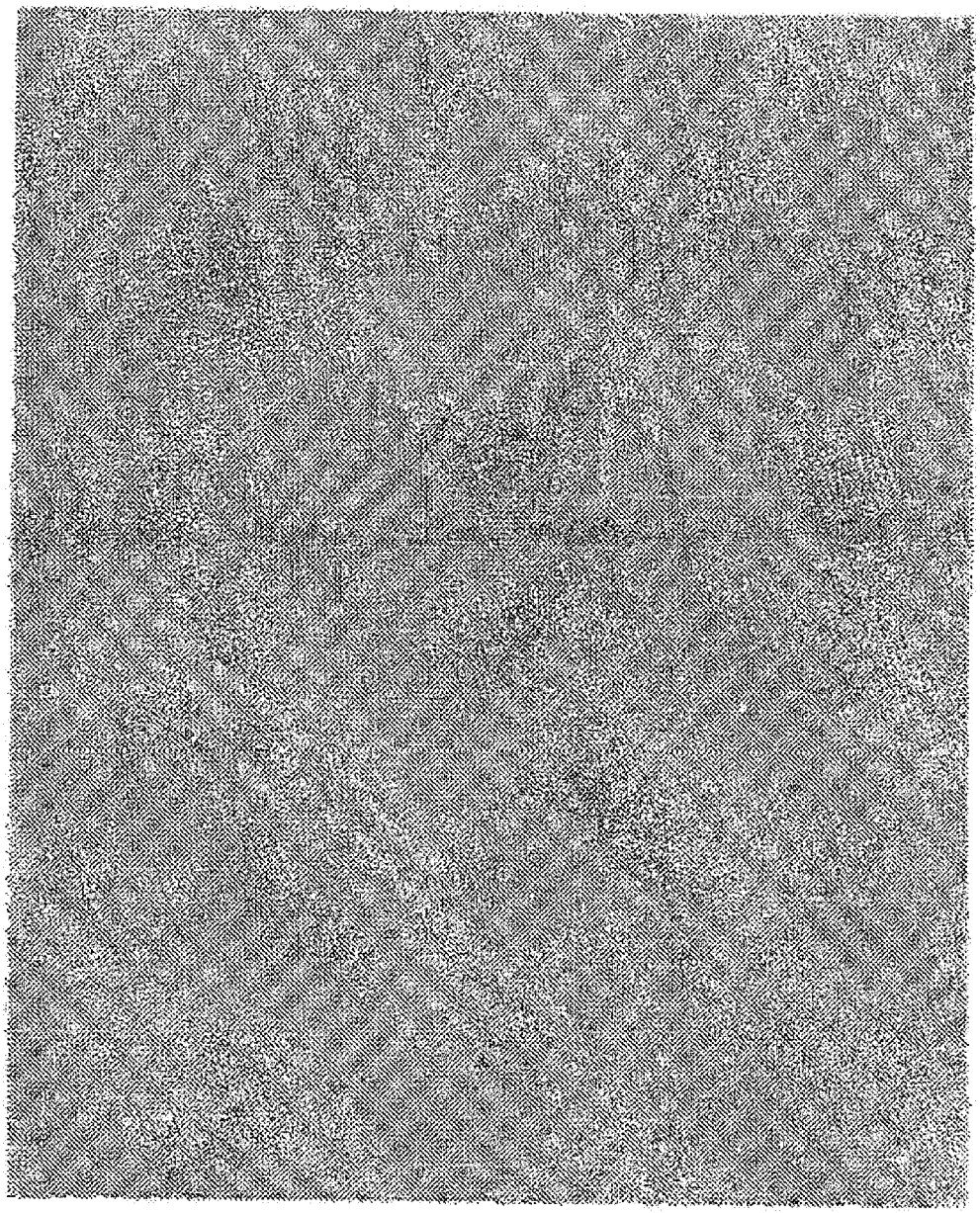

The cross-sectional appearance can be observed by observation with a transmission electron microscope (TEM). For example, with respect to the optical layered body of Comparative Example 3 described later (this example is a type out of the scope of the present invention and shows a result of the case where a polythiophene binder is an ultraviolet curable material. Other conventional types (that is, types using materials containing conductive ultrafine particles dispersed mainly for antistatic property) of optical layered bodies also show similar observation results), as shown in FIG. 2, which is a cross-sectional photograph by TEM (100000 times magnification), the respective cross-section phases of the hard coat layer, antistatic layer, and light transmitting substrate exist in sequence. The region of the vertical stripe patterns in the upper part is the cross-section phase of the hard coat layer; the black layer near the center is the cross-section phase of the antistatic layer; and the lower side of the black layer is the cross-section phase of the substrate. That is, the cross-section phase of the hard coat layer of the layered body is not observed in the region of the light transmitting substrate. On the other hand, according to FIG. 1, which is a cross-sectional photograph of the optical layered body of the present invention by TEM (100000 times magnification), it can be observed that the cross-section phase of the hard coat layer exists in the region of the light transmitting substrate via the antistatic layer from the hard coat layer. In other words, it can be observed that the cross-section phase of the hard coat layer invades the light transmitting substrate side via the antistatic layer. Examples of such an optical layered body include those characterized in that solvents contained in a composition for hard coat layers to be used for forming the hard coat layer swell and dissolve resin binders contained respectively in the antistatic layer and light transmitting substrate and at the same time, the composition penetrates the antistatic layer and reaches the light transmitting substrate. Although the hard coat layer part (region of the vertical stripe patterns) reaching the substrate side from the antistatic layer is only 0.1 to 0.2 μm, however it can be 5 to 6 μm or 6 to 20 μm depending on the solvent to be used for the composition for hard coat layers.

As described above, with respect to the appearance feature of the cross-section, since the cross-section phase of the hard coat layer continuously exists in the light transmitting substrate via the antistatic layer from the hard coat layer, the configuration that the hard coat layer, antistatic layer, and light transmitting substrate are substantially united can be effectively maintained and as a result, the optical layered body of the present invention can exhibit high adhesion.

Hereinafter, a substrate and a composition to be used in the present invention will be described more in detail. Additionally, in the present invention, unless otherwise specified, curable resin precursors such as monomers, oligomers and prepolymers are referred to as "resin".

Light Transmitting Substrate

A light transmitting substrate is preferably those provided with smoothness, heat resistance and excellent in mechanical strength.

Specific examples of materials for the light transmitting substrate include thermoplastic resins such as polyester (polyethylene terephthalate and polyethylene naphthalate), cellulose triacetate, cellulose diacetate, cellulose acetate butyrate, polyester, polyamide, polyimide, polyether sulfone, polysulfone, polypropylene, polymethylpentene, poly(vinyl chloride), polyvinyl acetal, polyether ketone, poly(methyl methacrylate), polycarbonate or polyurethane, and preferably polyester (polyethylene terephthalate and polyethylene naphthalate) and cellulose triacetate.

In the light transmitting substrate, the thermoplastic resin is preferably used in the form of film-like bodies with good flexibility, however, plates of these thermoplastic resins are also usable in accordance with the application aspects for which curability is required and also plate-like bodies such as glass plates may be used.

In addition, as the light transmitting substrate, amorphous olefin polymer (Cyclo-Olefin-Polymer: COP) films having alicyclic structures can be exemplified. They are substrates of norbornene polymer, monocyclic olefin polymer, cyclic conjugated diene polymer, vinyl alicyclic hydrocarbon polymer, and the like, and examples thereof include Zeonex and Zeonoa (norbornene resin) produced by Zeon Corporation; Sumilite FS-1700 produced by Sumitomo Bakelite Co., Ltd.; Arton (modified norbornene resin) produced by JSR Corporation; Apel (cyclic olefin copolymer) produced by Mitsui Chemicals, Inc.; Topas (cyclic olefin copolymer) produced by Ticona; Optorez OZ-1000 series (alicyclic acrylic resin) produced by Hitachi Chemical Co., Ltd.; and the like As substituting substrates of triacetyl cellulose, FV series (low birefringent refractive index, low optical elastic modulus film) produced by Asahi Kasei Corporation are also preferable.

The thickness of the light transmitting substrate is preferably 20 μm or more and 300 μm or less and more preferably 200 μm in the upper limit and 30 μm in the lower limit. In the case where the light transmitting substrate is a plate-like body, the thickness may exceed these thicknesses. The substrate may be previously subjected to physical treatment such as corona discharge treatment, oxidation treatment, and the like or may be coated with an anchor agent or a coating material called as a primer at the time of forming the antistatic layer in order to improve the adhesiveness.

Antistatic Layer

The antistatic layer is not particularly limited and may be suitably formed from a heat drying composition containing an antistatic agent and a thermoplastic resin. In this case, a solvent may be used if required. The type composition is a resin composition to form a coating film by drying the solvent by heating, on which processing is made possible, and the composition can be prepared by using a binder, a solvent, and the like similarly to publicly known thermoplastic coating materials and the like.

The antistatic agent is not particularly limited and one or more kinds of publicly known antistatic agents may be properly selected for use. Examples of the antistatic agent include a quaternary ammonium salt, a pyridinium salt, various cationic compounds having a cationic group such as a primary, a secondary, and a tertiary amino group; anionic compounds having an anionic group such as a sulfonate group, a sulfate group, a phosphate group and a phosphonate group; ampholytic compounds such as amino acid and aminosulfate; nonionic compounds such as amino alcohol, glycerin and polyethylene glycol; organic metal compounds such as alkoxide tin or titanium; and metal chelate compounds such as an acetylacetonate salt of the organic metal compound; and further include compounds formed by polymerizing the compounds described above. Further, polymerizable compounds such as monomer or oligomer which has a tertiary amino group, a quaternary ammonium group or a metal chelate moiety and is polymerizable with ionizing radiation, and organic metal compounds like a coupling agent having a functional group polymerizable with ionizing radiation can also be used as an antistatic agent.

Further, conductive ultrafine particles are also usable as an antistatic agent. Specific examples of the conductive ultrafine particles may include metal oxide fine particles. Examples of metal oxides may include ZnO (refractive index 1.90 or less, hereinafter, the numeral value in the parentheses shows the refractive index), $CeO_2$ (1.95), $Sb_2O_3$ (1.71). $SnO_2$ (1.997), indium tin oxide often referred to as ITO (1.95), $In_2O_3$ (2.00), $Al_2O_3$ (1.63), antimony-doped tin oxide (abbreviation: ATO, 2.0), and aluminum-doped zinc oxide (abbreviation: AZO, 2.0). In addition, although not being included in metal oxides, inorganic carbon nanotubes, fullerene, and the like can be exemplified. Fine particles mean those having sizes of 1 micron or less, so-called sub-micron and those having an average particle diameter of 0.1 nm to 0.1 μm are preferable. The above-mentioned average particle diameter can be measured by a dynamic light scattering method, or the like.

Further, usable as organic antistatic agents are, for example, conductive polymers such as polyacetylene, polyaniline, polythiophene, polypyrrole, polyphenylene sulfide, poly(1,6-heptadiine), polybiphenylene (poly-p-phenylene), poly-p-phenylene sulfide, polyphenylacetylene, polyfuran, poly(3,4-ethylenedioxythiophene), polyisothianaphthene, polyacene, or their derivatives. One or more kinds of them may be used in combination. The derivatives are not particularly limited and alkyl-substituted polyphenylacetylene, polydiacetylene, and the like can be exemplified.

In the present invention, particularly, it is preferable to use at least one kind of the conductive polymers. Use of the conductive polymer gives higher transmittance of the layered body of the present invention and at the same time gives a lower haze value.

The thermoplastic resins are not particularly limited; however in terms of preparation of the heat drying composition, preferably usable examples are cellulose derivatives (e.g. acetyl cellulose, nitrocellulose, acetyl butyl cellulose, ethyl cellulose, methyl cellulose, and the like), vinyl resins (e.g. vinyl acetate, its copolymers, vinyl chloride and its copolymers, vinylidene chloride and its copolymers, and the like), acetal resins (e.g. polyvinyl formal, polyvinyl butyral, and the like), acrylic resins (acrylic resins and their copolymers, methacrylic resins and their copolymers, and the like), as well as polystyrene resins, polyamide resins, polycarbonate resins, and the like.

In the case where a thermoplastic resin is used, the content of the antistatic agent in the composition may be properly set in accordance with the kind of the antistatic agent to be used; however it is adjusted preferably about 1 to 50% by weight and particularly preferably 5 to 20% by weight of the antistatic agent in total 100% by weight of the antistatic agent and the thermoplastic resin.

Further, in the composition, a solvent may be also used if required. The solvent may be properly selected among publicly known solvents in accordance with the kinds of an antistatic agent to be used. For example, in the case where polythiophene is used as the antistatic agent, water and also one or more of the following solvents may be used: methanol, ethanol, propanol, butanol, n-amyl alcohol, isoamyl alcohol, sec-amyl alcohol, tert-amyl alcohol, 1-ethyl-1-propanol, 2-methyl-1-butanol, methyl glycol, methyl glycol acetate, methyl cellosolve, ethyl cellosolve, butyl cellosolve, propylene glycol, propylene glycol monoethyl ether, propylene glycol monobutyl ether, n-hexanol, cyclohexanol, and the like.

A method for preparing the composition is not particularly limited if the respective components are mixed evenly and may be carried out in a public manner. For example, publicly known apparatus such as a paint shaker, a bead mill, a kneader and a mixer can be used.

In the case of forming the antistatic layer, for example, the above-mentioned composition is used as a composition for antistatic layers and a coating film of the composition is formed and then the coating film is cured. A coat formation method may be a publicly known method. For example, various methods such as a spin coating method, a dipping method, a spraying method, a dyed coating method, a bar coating method, a roll coater method, a meniscus coater method, a flexo-printing method, a screen printing method, a bead coater, and the like, may be employed.

The thickness (dry thickness) of the antistatic layer is preferably about 10 nm to 500 nm and particularly preferably 50 to 200 nm. If the thickness is less than 10 nm, it is desirable for optical performance such as total light transmittance, haze, and the like; however the aimed antistatic performance (saturated charge voltage: less than 2.0 kV) cannot be obtained in some cases. Further, in the case where the thickness exceeds 500 nm, it takes a very long time to make the cross-section phase of the hard coat layer exist in the light transmitting substrate via the antistatic layer and it may possibly result in inefficiency in terms of the production processability. According to the above-mentioned reasons, it is desirable to set the above-mentioned film thickness in the range. The thickness of the antistatic layer is a value measured by observing the cross-section by an electron microscope (SEM, TEM, STEM).

Hard Coat Layer

"Hard coat layer" in the present invention means those having hardness of "H" or higher in a pencil hardness test standardized in JIS K5600-5-4 (1999). In the optical layered body of the present invention, the hard coat layer is desirable to have hardness of 2H or higher pencil hardness. The hard coat layer is desirable to have a Vicker's hardness of 250 N/mm or higher.

The hard coat layer is not particularly limited as long as it has transparency; however it is preferable to contain a resin.

The resin is not particularly limited and examples are the following three kinds: ionizing radiation-curable resins which are resins to be cured with ultraviolet light or electron beams; a mixture of the ionizing radiation-curable resin and a solvent drying resin (a resin, in which a coating film is formed by only evaporating a solvent previously added in order to adjust a solid content during the application of the resin); and a thermosetting resin. The ionizing radiation-curable resins are preferable. According to a preferable embodiment of the present invention, resins containing at least ionizing radiation-curable resins and thermosetting resins may be used.

Examples of the ionizing radiation-curable resins include compounds having one or more unsaturated bonds such as compounds having acrylate functional groups. Examples of the compounds having one unsaturated bond include ethyl (meth)acrylate, ethylhexyl (meth)acrylate, styrene, methylstyrene, N-vinylpyrrolidone, and the like. Examples of the compounds having two or more unsaturated bonds include a polyfunctional compound such as polymethylolpropane tri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate or neopentyl glycol di(meth)acrylate; and reaction products (for example, a poly(meth)acrylate ester of polyhydric alcohol) of the polyfunctional compound with (meth)acrylate, and the like. In addition, as used herein, "(meth)acrylate" refers to methacrylate or acrylate.

In addition to the above-mentioned compounds, polyester resins, polyether resins, acrylic resins, epoxy resins, urethane resins, alkyd resins, spiroacetal resins, polybutadiene resins, polythiol polyene resins, and the like having unsaturated double bonds and relatively low molecular weights may also be use as the ionizing radiation-curable resins.

In the case where an ionizing radiation-curable resin is used as the ultraviolet curable resin, it is preferable to use a photo polymerization initiator. Specific examples of the photo polymerization initiator include acetophenones, benzophenones, Michiler benzoyl benzoate, α-aminoxime ester, thioxanthones, propiophenones, benzyls, benzoins, and acylphosphine oxides. Further, it is also preferable to mix a photosensitizer and Specific examples are n-butylamine, triethylamine, and poly-n-butylphosphine.

Examples to be usable as the photo polymerization initiator to be added to the ionizing radiation-curable resin composition are acetophenones, benzophenones, Michiler benzoyl benzoate, α-aminoxime ester, tetramethylthiuram monosulfide, thioxanthones, and the like. Further, in the case of a resin having a cationic polymerizable functional group, aromatic diazonium salts, aromatic sulfonium salts, aromatic iodonium salts, metallocene compounds, benzoinsulfonic acid esters are preferable to be used alone or in the form of mixtures as a photo polymerization initiator. Further, if required, photosensitizers and photopolymerization promoters are added. The photosensitizers and photopolymerization promoters may be publicly known photosensitizers and examples are benzoin compounds such as benzoin, benzoin methyl ether, benzoin ethyl ether, benzoin isopropyl ether, α-methylbenzoin, α-phenylbenzoin and the like; anthraquinone compounds such as anthraquinone, methylanthraquinone, and the like; benzyl; diacetyl; phenyl ketone compounds such as acetophenone, benzophenone, and the like; sulfide compounds such as diphenyl disulfide, tetramethylthiurum sulfide, and the like; α-chloromethylnaphthalene; anthracene; halogenated hydrocarbons such as hexachlorobutadiene, pentachlorobutadiene, and the like; and thioxanthone, n-butylamine, triethylamine, tri-n-butylphosphine, and the like.

Specifically, for acetophenone photo polymerization initiator, a benzophenone or thioxanthone photosensitizer is preferable to be used.

The addition amount of the photo polymerization initiator is preferably 0.1 to 10 parts by weight with respect to 100 parts by weight of the ionizing radiation-curable composition.

A thermoplastic resin is mainly exemplified as the solvent drying resin to be used while being mixed with the ionizing radiation-curable resin. Those commonly exemplified are usable as the thermoplastic resin. Addition of the solvent drying resin can efficiently prevent the coating film defects on the coated face. Specific examples of preferable thermoplastic resin include those which are commonly known as thermoplastic resins. Addition of the solvent drying resin can efficiently prevent the coating film defects on the coated face. Specific examples of preferable thermoplastic resins include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, rubber or elastomers, and the like. As the thermoplastic resin, it is preferable to use a resin which is generally amorphous and soluble in organic solvents (particularly, solvents in which a plurality of polymers and curing compounds are dissolved). Particularly, resins with high moldability, film formability, transparency, and weathering resistance such as styrene resins, (meth) acrylic resins, alicyclic olefin resins, polyester resins, cellulose derivatives (cellulose esters), and the like.

In a preferable embodiment of the present invention, in the case where a material of the light transmitting substrate is a cellulose resin such as triacetyl cellulose "TAC", specific examples of preferable thermoplastic resins include cellulose resins such as nitrocellulose, acetyl cellulose, cellulose acetate propionate, ethylhydroxy ethyl cellulose and the like. Use of the cellulose resin can improve the adhesion between the light transmitting substrate and the hard coat layer and transparency.

Examples of the thermosetting resin usable as the resin include phenol resins, urea resins, diallyl phthalate resins, melamine resins, guanamine resins, unsaturated polyester resins, polyurethane resins, epoxy resins, aminoalkyd resins, melamine-urea copolycondensation resins, silicon resins, polysiloxane resins, and the like. In the case of using thermosetting resins, if necessary, a curing agent such as a crosslinking agent and a polymerization initiator; a polymerization promoter, a solvent and a viscosity adjustment agent, and the like may be used in combination.

The hard coat layer can be formed by using a solution or a dispersion obtained by dissolving or dispersing a resin and if necessary an additive (e.g. a polymerization initiator, an antiglare agent, an antifouling agent, a leveling agent, and the like) as a composition for hard coat layers, forming a coating film of the composition, and curing the coating film. As the solvent, solvents are properly selected in accordance with the kind and solubility of the resin and used and may be those in which at least solid matter (a plurality of polymers, curing resin precursors, reaction initiators, other additives) can evenly be dissolved. Examples of such solvents include ketones (acetone, methyl ethyl ketone, methyl isobutylketone, cyclohexanone, and the like), ethers (dioxane, tetrahydrofuran, and the like), aliphatic hydrocarbons (hexane, and the like), alicyclic hydrocarbons (cyclohexane, and the like), aromatic hydrocarbons (toluene, xylene, and the like), halogenated carbons (dichloromethane, dichloroethane, and the like), esters (methyl acetate, ethyl acetate, butyl acetate, and the like), water, alcohols (ethanol, isopropanol, butanol, cyclohexanol, and the like), cellosolves (methyl cellosolve, ethyl cellosolve, and the like), cellosolve acetates, sulfoxides (dimethyl sulfoxides, and the like), amides (dimethylformamide, dimethylacetamide, and the like), and their solvent mixtures are also usable.

The composition for hard coat layers is preferable to contain a penetrable solvent having penetrability to the thermoplastic resin of the antistatic layer to be formed. In the present invention, "penetrability" of the penetrable solvent means the comprehensive concept including penetrability, swelling property, and wetting property, to the thermoplastic resin. Such a penetrable solvent swells and wets the thermoplastic resin, so that a portion of the composition for hard coat layers can has a behavior such that the upper to the lower part of the antistatic layer and further a layer thereunder are penetrated.

The solvent can be determined in accordance with whether the resin in the hard coat layer is adhesive to the substrate or not. For example, in the case where the resin is not adhesive to the substrate, it is preferable to use a solvent having penetrability to the substrate. For example, in the case where the substrate is TAC, specific examples of the penetrable solvent are ketones such as acetone, methyl ethyl ketone, cyclohexanone, methyl isobutyl ketone, and diacetone alcohol; esters such as methyl formate, methyl acetate, ethyl acetate, butyl acetate, and ethyl lactate; nitrogen-containing compounds such as nitromethane, acetonitrile, N-methylpyrrolidone, and N,N-dimethylformamide; glycols such as methyl glycol, and methyl glycol acetate; ethers such as tetrahydrofuran, 1,4-dioxane, dioxolane, and diisopropyl ether; halogenated hydrocarbons such as methylene chloride, chloroform, and tetrachloroethane; glycol ethers such as methyl cellosolve, ethyl cellosolve, butyl cellosolve, and cellosolve acetate; dimethyl sulfoxide; propylene carbonate; and their mixtures. Preferable examples include esters and ketones such as methyl acetate, ethyl acetate, butyl acetate, methyl ethyl ketone, and the like. Additionally, alcohols such as methanol, ethanol, isopropyl alcohol, butanol, and isobutyl alcohol; aromatic hydrocarbons such as toluene and xylene are also usable while being mixed with the penetrable solvent.

In the composition for hard coat layers, it is desirably 10 to 100% by weight and particularly preferably 50 to 100% by weight in the total solvent.

The content ratio (solid matters) of the raw materials in the composition for hard coat layers is not limited; however it is, in general, preferably 5 to 70% by weight and particularly preferably 25 to 60% by weight.

Corresponding to the object of increase in the hardness of the hard coat layer, suppression of curing shrinkage, control of refractive index, give an antiglare property, and the like, the composition for hard coat layers may contain a resin, a dispersant, a surfactant, an antiglare agent, an antistatic agent, a silane coupling agent, a thickener, a coloration preventing agent, a coloring agent (pigment and dye), a defoaming agent, a leveling agent, a flame retardant, an ultraviolet absorbent, an adhesion-providing agent, a polymerization inhibitor, an antioxidant, a surface reforming agent, and the like.

As the antistatic agent, one or more kinds of antistatic agents to be used for the antistatic layer can be used.

As the antiglare agent, one or more kinds of antiglare agents to be used for the antiglare layer described below may be used.

A method for preparing the composition for hard coat layers is not particularly limited, if the respective components can be mixed evenly, and the method may be carried out using a publicly known apparatus such as a paint shaker, a bead mill, a kneader, a mixer and the like.

Specifically, the process for forming the hard coat layer is carried out by forming a coating film by applying the composition for hard coat layers and curing the obtained coating film. A method for the application is not particularly limited and examples are publicly known methods such as a spin coating method, a dipping method, a spraying method, a die coating method, a bar coating method, a roll coater method, a meniscus coater method, a flexo-printing method, a screen printing method, a bead coater method, and the like.

Curing of the coat is not particularly limited; however it is preferable to cure the film by drying if necessary, and heating, active energy beam radiation, and the like.

The film thickness (at the time of curing) of the hard coat layer is 0.1 to 100 µm, preferably 0.8 to 20 µm, and more preferably 1.5 to 10 µm. The film thickness is a value measured by observing the cross-section with an electron microscope (SEM, TEM, STEM).

The active energy beam radiation may be radiation of ultraviolet rays or electron beam. Specific examples of an ultraviolet ray source are light sources such as an ultra high pressure mercury lamp, a high pressure mercury lamp, a low pressure mercury lamp, a carbon arc lamp, a black light fluorescent lamp, a metal halide lamp, and the like. The wavelength of the ultraviolet rays is in a range from 190 to 380 nm. Specific examples of an electron beam source are various electron beam accelerators such as Cockcroft-Walton type, Van de Graaff type, resonance transformer type, insulating core transformer type, linear type, dynamitron type, high frequency type, and the like.

Other Layers

As the basic layer configuration of the present invention, at least the antistatic layer and the hard coat layer are formed in sequence on the light transmitting substrate. Therefore, within a range that the light transmittance of the layered body of the present invention is not deteriorated, one or more layers of other layers (e.g. an antiglare layer, a low refractive index layer, a antifouling layer, an adhesive layer, and other hard coat layers) may be properly formed on the hard coat layer if necessary and it is preferable to form at least one layer selected from the group consisting of an antiglare layer, a low refractive index layer, and a antifouling layer. These layers may be those publicly known antireflection layered bodies.

Antiglare Layer

The antiglare layer may be formed, for example, between the transparent substrate and either the hard coat layer or a low refractive index layer (described later). The antiglare layer may be formed from a resin composition containing a resin and an antiglare agent.

As the resin, those described in the hard coat layer may be properly selected and used.

As the antiglare agent, various fine particles can be used. The average particle diameter of the fine particles is not particularly limited; however it is generally about 0.01 to 20 µm. The shape of the fine particles may be truly spherical or elliptical and preferably truly spherical. The fine particles may include inorganic and organic particles.

The fine particles exhibit antiglare property and preferably transparent. Specific examples of the fine particles include, in the case of an inorganic type, silica beads and in the case of an organic type, plastic beads. Specific examples of plastic beads are styrene beads (refractive index; 1.60), melamine beads (refractive index; 1.68), acryl beads (refractive index; 1.49), acryl-styrene beads (refractive index; 1.54, 1.52 to 1.56), benzoguanamine-formaldehyde condensate beads (1.66), melamine-formaldehyde condensate beads (1.66), benzoguanamine-melamine-formaldehyde condensate beads (1.52), polycarbonate beads, polyethylene beads, and the like.

The fine particles are preferably those which satisfy all of the following numeral equations:

$30 \leq Sm \leq 600$, $0.05 \leq Rz \leq 1.60$, $0.1 \leq \theta a \leq 2.5$, $0.3 \leq R \leq 20$:

wherein R (μm) denotes the average particle diameter; Rz (μm) denotes ten-point average roughness of the surface unevenness of the antiglare layer; Sm (μm) denotes the average interval of the unevenness of the antiglare layer; and θa denotes the average slanting angle β of the uneven parts.

Sm (μm) means the average interval of the unevenness of the antiglare layer; θa (degree) means the average slanting angle of the uneven parts; and (Rz) means ten-point average roughness of the surface unevenness of the antiglare layer and their definitions are standardized in JIS B 0601-1994 and also described in instruction manual (revised on Jul. 20, 1995) of the surface roughness measurement apparatus: SE-3400 produced by Kosaka Laboratory Ltd.

The unit of θa is angle degree and in the case where Δa denotes the horizontal to vertical ratio of the inclination, Δa=tan θa=(total of differences of the minimum parts and maximum parts of respective projections and recessions (equivalent to the height of the respective projections)/standardized length). The standardized length is equal to the cut-off value λc of the roughness curve measured by measurement apparatus SE-3400, which is the actually probed evaluation length.

Further, in another preferable embodiment of the present invention, the antiglare layer is preferable to satisfy Δn=|n1−n2|<0.1 in the case where the refractive indexes of the fine particles and the resin composition are defined as n1 and n2, respectively, and the haze value of the inside of the antiglare layer is 55% or lower.

The addition amount of the fine particles, although it depends on the kind and desired antiglare property of the fine particles, may be generally 2 to 40 parts by weight and preferably 10 to 25 parts by weight per 100 parts by weight of the resin composition.

At the time of preparing a composition for antiglare layers, a precipitation preventing agent may be added. Addition of the precipitation preventing agent suppresses precipitation of resin beads and evenly disperses them in a solvent. Specifically, as the precipitation preventing agent, beads such as silica beads can be used. The average particle diameter of the beads is not generally 0.5 μm or smaller and preferably 0.1 to 0.25 μm.

The film thickness of the antiglare layer (during curing) is, in general, preferably about 0.1 to 100 μm and particularly preferably about 0.8 to 10 μm. If the film thickness is not within the range, the function as the antiglare layer cannot be exhibited sufficiently.

The film thickness of the antiglare layer can be measured by the following method. The cross-section of the optical layered body is observed by a confocal laser microscope (Leica TCS-NT: produced by Leica: magnification "300 to 1000") and existence of interfaces is determined to carry out measurement on the basis of the following evaluation standards. Specifically, in order to obtain clear halation-free images, a wet type objective lens is used for the confocal laser microscope and about 2 ml of oil with a refractive index of 1.518 is put on the optical layered body and observation is carried out for the judgment. The oil is used for elimination of an air layer between the objective lens and the optical layered body.

Measurement Procedure

1: The average film thickness is measured by laser microscope observation.
2: The measurement condition is as described above.
3: The thickness of the layer at the maximum projection and the minimum recession of a substrate is measured each in total 2 points for one image, measurement is carried out in total 10 points for 5 images, and the average value is calculated.

The laser microscope is enabled to observe nondestructive cross-section since there are refractive index differences among respective layers. Accordingly, if the refractive index difference is unclear or close to 0, the film thickness of the antiglare layer can be measured similarly by carrying out 5 image observation using cross-sectional photographs of SEM and TEM which can carry out observation on the basis of the composition differences of respective layers.

Low Refractive Index Layer

The low refractive index layer is a layer having a function of lowering the reflectivity when outside light (e.g. fluorescent lamp and natural light) is reflected on the surface of the optical layered body. The low refractive index layer preferably include a thin film containing one of 1) a resin containing silica or magnesium fluoride, 2) a fluoro resin, which is a flow refractive index resin, 3) a fluoro resin containing silica or magnesium fluoride, and 4) silica or magnesium fluoride. The low refractive index layer is preferable to have a refractive index of 1.45 or lower, particularly 1.42 or lower. The thickness of the low refractive index layer is not particularly limited; however it may properly be set in a range from 30 nm to 1 μm. The thickness of the low refractive index layer can be measured in the same manner as the above-mentioned manner for the hard coat layer and low refractive index layer. The resin other than the fluoro resin is the same as the resin composing the hard coat layer.

As the fluoro resin, polymerizable compounds containing at least fluorine atoms in the molecule or their polymers may be used. The polymerizable compounds are not particularly limited and examples include those having curing reactive groups such as ionizing radiation-curing groups, thermosetting polar groups and the like. Further, examples may include compounds having these reactive groups in combination. Compared to the polymerizable compounds, the polymers are those which have no reactive group described above.

As the polymerizable compounds having the ionizing radiation-curing groups, fluorine-containing monomers having an ethylenic unsaturated bond can be widely used. More Specific examples include fluoro-olefins (e.g. fluoroethylene, vinylidene fluoride, tetrafluoroethylene, hexafluoropropylene, perfluorobutadiene, perfluoro-2,2-dimethyl-1,3-dioxol, and the like). Examples of polymerizable compounds having a (meth)acryloyloxy group include fluorine-containing (meth)acrylate compounds such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl) ethyl (meth)acrylate, 2-(perfluorooctyl)ethyl (meth)acrylate, 2-(perfluorodecyl)ethyl (meth)acrylate, α-trifluoromethyl methacrylate, and α-trifluoroethylmethacrylate; and fluorine-containing polyfunctional (meth)acrylic acid ester compounds containing fluoroalkyl groups, fluorocycloalkyl groups, or fluoroalkylene groups having at least 3 fluorine atoms and 1 to 14 carbon atoms and at least two (meth) acryloyloxy groups.

Preferable examples of the thermosetting polar group include, for example, hydrogen bond formable groups such as a hydroxyl group, a carboxyl group, an amino group and an epoxy group. They are not only adhesive to the coating film but also excellent in the affinity with inorganic ultrafine particles such as silica. Examples of polymerizable compounds having thermosetting polar groups include 4-fluoroethylene-perfluoroalkyl vinyl ether copolymers; fluoroethylene-hydrocarbon vinyl ether copolymers; and fluorine-modified products of epoxy, polyurethane, cellulose, phenol, and polyimide resins.

Examples of polymerizable compounds having both ionizing radiation-curing group and thermosetting polar group include partially or completely fluorinated alkyl, alkenyl, aryl esters of acrylic or methacrylic acid; completely or partially fluorinated vinyl ethers; completely or partially fluorinated vinyl esters; completely or partially fluorinated vinyl ketones; and the like.

Further, examples of fluoro resins are as follows; polymers of monomers or monomer mixtures containing at least one kind of fluorine-containing (meth)acrylate compounds of the polymerizable compounds having ionizing radiation-curing groups; copolymers of at least one kind of the fluorine-containing (meth)acrylate compounds with fluorine atom-free (meth)acrylate compounds in the molecule such as methyl (meth)acrylate, ethyl (meth)acrylate, propyl (meth)acrylate, butyl (meth)acrylate, and 2-ethylhexyl (meth)acrylate; homopolymers or copolymers of fluorine-containing monomers such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene. Silicone-containing fluorovinylidene copolymers obtained by introducing silicone components into these copolymers are also usable.

Examples of silicone components include (poly)dimethylsiloxane, (poly)dimethylsiloxane, (poly)diphenylsiloxane, (poly)methylphenylsiloxane, alkyl-modified (poly)dimethylsiloxane, azo group-containing (poly)dimethylsiloxane, dimethylsilicone, phenylmethylsilicone, alkyl/aralkyl-modified silicone, fluorosilicone, polyether-modified silicone, fatty acid ester-modified silicone, methylhydrosilicone, silanol group-containing silicone, alkoxy group-containing silicone, phenol group-containing silicone, methacryl-modified silicone, amino-modified silicone, carboxylic acid-modified silicone, carbinol-modified silicone, epoxy-modified silicone, mercapto-modified silicone, fluorine-modified silicone, polyether-modified silicone and the like. In particular, those having dimethylsiloxane structure are preferable.

Specific examples of the dimethylsiloxane structure include those obtained by mixing or further previously reacting polyalkyl, polyalkenyl, or polyarylsiloxanes such as silanol groups-terminated polydimethylsiloxane, polymethylphenylsiloxane, and polymethylvinylsiloxane with various crosslinking agents, e.g. tetrafunctional silanes such as tetraacetoxysilane, tetraalkoxysilane, tetraethylmethylketoximesilane, tetraisopropenylsilane, and trifunctional silanes such as alkyl or alkenyltriacetoxysilane, triketoximesilane, triisopropenylsilanetrialkoxysilane and the like.

Further, non-polymer or polymers of the following compounds are also usable as fluoro resins. That is, compounds obtained by reaction of fluorine-containing compounds having at least one isocyanato group in each molecule with compounds having at least one functional group such as an amino group, a hydroxyl group, and a carboxyl group in each molecule which is reactive on an isocyanato group; compounds obtained by reaction of fluorine-containing polyols such as fluorine-containing polyether polyols, fluorine-containing alkyl polyols, fluorine-containing polyester polyols, and fluorine-containing ∈-caprolactone-modified polyols with isocyanato group-containing compounds; and the like.

Further, in combination with the fluorine atom-containing polymerizable compounds and polymers, the resin components described for the composition for hard coat layers may also be used. Furthermore, curing agents for curing the reactive groups and various additives and solvents for improving coatability or providing antifouling property may be properly selected and used.

Specifically, the silicone-containing vinylidene fluoride copolymers are obtained by copolymerizing monomer compositions containing 30 to 90% of vinylidene fluoride and 5 to 50% of hexafluoropropylene (percentage is on the basis of weight, hereinafter the same).

The silicone-containing vinylidene fluoride copolymers have, as ratios of the respective components in the form of a monomer composition, 30 to 90%, preferably 40 to 80%, more preferably 40 to 70% of vinylidene fluoride; 5 to 50%, preferably 10 to 50%, and more preferably 15 to 45% of hexafluoropropylene. The monomer composition may further contain 0 to 40%, preferably 0 to 35%, and more preferably 10 to 30% of tetrafluoroethylene.

The monomer composition may contain other copolymer components in an amount of, for example, 20% or lower and preferably 10% or lower, within such a range that the aim and effect of the use of the above-mentioned silicone-containing vinylidene fluoride copolymers is not made ineffective. Specific examples of such copolymer components include one or more kinds of polymerizable monomers having fluorine atoms such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, α-trifluoromethacrylic acid, and the like.

The fluorine-containing copolymers obtained from the above-mentioned monomer composition is required to have a fluorine-containing ratio of 60 to 70% and the fluorine-containing ratio is a preferably 62 to 70% and particularly preferably 64 to 68%. The fluorine-containing polymers have good solubility in a solvent by setting the fluorine-containing ratio in the above-mentioned range and contains the fluorine-containing polymers as a component, and therefore the fluorine-containing polymers have excellent adhesion to various substrates and makes it possible to form a thin film having sufficiently excellent mechanical strength. Thus, the thin film to be formed is provided with sufficiently high mechanical properties such as scratching resistance of the surface.

The fluorine-containing copolymers have a molecular weight of preferably 5000 to 200000 and particularly preferably 10000 to 100000 on the basis of polystyrene-converted number average molecular weight. Use of the fluorine-containing copolymers having such a molecular weight gives desirable viscosity to the fluoro resin composition to be obtained and accordingly, the fluoro resin composition is reliably provided with proper coatability. The fluorine-containing copolymers have their own refractive index of 1.45 or less, particularly preferably 1.42 or less, and more particularly preferably 1.40 or less. In the case of using the fluorine-containing copolymers having a refractive index exceeding 1.45, a thin film to be formed from a fluorine coating composition to be obtained may sometimes to have only a slight antireflection effect.

Further, in the present invention, as the curing fluorine-containing copolymers to be used for a low refractive index agent, perfluoroalkyl-containing silane compounds (e.g. (heptadecafluoro-1,1,2,2-tetrahydrodecyl)triethoxysilane) as well as fluorine-containing copolymers containing fluorine-containing monomer units and constituent units for giving crosslinking reactivity as constituent components are used.

Specific examples of the fluorine-containing monomer units are fluoroolefins (e.g. fluoroethylene, vinylidene fluoride, tetrafluoroethylene, hexafluoroethylene, hexafluoropropylene, perfluoro-2,2-dimethyl-1,3-dioxole, and the like), partially or completely fluorinated alkyl ester derivatives of (meth) acrylic acid (e.g. Viscoat 6 FM, from Osaka Organic Chemical Industry Ltd.; M-2020, from Daikin Industries, Ltd.), and completely or partially fluorinated vinyl ethers and preferable examples are perfluoroolefins. Particularly, in terms of the refractive index, solubility, transparency, availability, and the like, hexafluoropropylene is more preferable.

Examples of constituent units for providing curing reactivity may include constituent units obtained by polymerization of monomers having self-curing functional groups in the molecules such as glycidyl (meth)acrylate and glycidyl vinyl ether; constituent units obtained by polymerization of monomers having a carboxyl group, a hydroxyl group, an amino group, a sulfo group, or the like (e.g. (meth)acrylic acid, methylol (meth)acrylate, hydroxyalkyl (meth)acrylate, allyl acrylate, hydroxyethyl vinyl ether, hydroxybutyl vinyl ether, maleic acid, crotonic acid, and the like); and constituent units obtained by introduction of curing reactive groups such as (meth)acryloyl into these constituent units by polymer reaction (e.g. introduction may be carried out by a technique of reacting chloride acrylate on a hydroxyl group or the like).

Further, in terms of the solubility in a solvent and transparency of a coating film, other than the above-mentioned fluorine-containing monomer units and constituent units for providing curing reactivity, monomers having no fluorine atom may be copolymerized. Monomer units to be used in combination are not particularly limited and may include, for example, olefins (ethylene, propylene, isoprene, vinyl chloride, vinylidene chloride, and the like), acrylic acid esters (methyl acrylate, methyl acrylate, ethyl acrylate, and 2-ethylhexyl acrylate), methacrylic acid esters (methyl methacrylate, ethyl methacrylate, butyl methacrylate, and ethylene glycol dimethacrylate), styrene derivatives (styrene, divinylbenzene, vinyltoluene, α-methylstyrene, and the like), vinyl ethers (methyl vinyl ether, ethyl vinyl ether, cyclohexyl vinyl ether, and the like), vinyl esters (vinyl acetate, vinyl propionate, vinyl cinnamate, and the like), acrylamides (N-tert-butylacrylamide, N-cyclohexylacrylamide, and the like), methacrylamides, and acrylonitrile derivatives, and the like.

Curing agents may properly be used in combination with the above-mentioned polymers as described in Japanese Kokai Publication Hei-8-92323, Hei-10-25388, Hei-10-147739, and Hei-12-17028. Particularly, in the case where the curing reactive groups of the polymers are groups just like a hydroxyl group or a carboxyl group having no curing reactivity by themselves, it is indispensably required to use a curing agent. Examples of the curing agent are polyisocyanate, aminoplast, polybasic acids, and their anhydrides. On the other hand, in the case where the curing reactive groups are groups having self-curing reactivity, it is not particularly required to add any curing agent; however various curing agent such as polyfunctional (meth)acrylate compounds, polyfunctional epoxy compounds, and the like may properly be used in combination.

The fluorine-containing copolymers particularly usable for the low refractive index agent are random copolymers of perfluoroolefins with vinyl ethers or vinyl esters and particularly, those having crosslinkable groups by themselves (radical reactive groups such as a (meth)acryloyl group and ring-opening polymerizable groups such as an epoxy group and an oxetanyl, and the like) are preferable. These crosslinkable group-containing polymerization units are in an amount of preferably 5 mole % or higher and 70 mole % or lower and more preferably 30 mole % or higher and 60 mole % or lower in the entire polymerization units.

In the low refractive index agent of the present invention, it is preferable to introduce a polysiloxane structure into the fluorine-containing copolymers in order to provide an antifouling property. A method for introducing the polysiloxane structure is not particularly limited; however methods for introducing polysiloxane block copolymer components using silicone macro azo initiator as described in Japanese Kokai Publication Hei-11-189621, Hei-11-228631 and 2000-313709 and methods for introducing polysiloxane graft copolymer components using silicone macromer as described in Hei-2-251555 and Hei-2-308806 are preferable. In these cases, the polysiloxane structure in the polymers is in an amount of preferably 0.55% by weight or higher and 10% by weight or lower and particularly preferably 1% by weight or higher and 5% by weight or lower.

To provide the antifouling property, reactive group-containing polysiloxanes besides the above-exemplified ones may be preferably added. The reactive group-containing polysiloxanes may be commercialized products. Examples of the commercialized products are trade names KF-100T, X-22-169AS, KF-102, X-22-37011E, X-22-164B, X-22-5002, X-22-173B, X-22-174D, X-22-167B, and X-22-161AS all produced by Shin-Etsu Chemical Co., Ltd.; trade names AK-5, AK-30, and AK-32 produced by Toagosei Co., Ltd.; trade names Silaplane FM0275 and Silaplane FM0721 produced by Chisso Corporation. In this case, these polysiloxanes are added in an amount of preferably 0.5% by weight or higher and 10% by weight or lower and more preferably 1% by weight or higher and 5% by weight or lower in the entire solid matter of the low refractive index layer.

For the low refractive index agent in the present invention, examples available as commercialized fluorine-containing compounds are TEFRON (trade name) AF 1600 (produced by Du-Pont, refractive index n=1.30), CYTOP (produced by Asahi Glass Co., Ltd., refractive index n=1.34), 17FM (produced by Mitsubishi Rayon Co., Ltd., n=1.35), Opster JN-7212 (produced by JSR Corporation, n=1.40), Opster JN-7228 (produced by JSR Corporation, n=1.42), and LR 201 (produced by Nissan Chemical Industries, Ltd., n=1.38) (all are trade names).

In addition, the low refractive index layer may be a thin film of $SiO_2$. For example, the thin film may be formed by a vapor deposition method such as an evaporation method, a sputtering method, and a plasma CVD; and a liquid phase method for forming a $SiO_2$ gel film from a sol solution containing $SiO_2$ sol. Further, a low refractive index layer may be formed using a material of a thin film of $MgF_2$ or the like besides $SiO_2$. Specifically, in terms of the adhesion to the lower layer, the $SiO_2$ thin film is preferable. Further, in the case of employing the plasma CVD method among the above-mentioned techniques, the method is carried out preferably using an organosiloxane as a raw material gas in the absence of other inorganic evaporation sources. Further, in this case, it is also preferable that a subject to be deposited is kept at a temperature as low as possible.

In the case of forming the low refractive index layer, for example, a composition containing raw material components (composition for low refractive index layers) may be used. More specifically, a solution or a dispersion obtained by dissolving or dispersing raw material components (resin, and the like) and based on the necessity, additives (e.g. "fine particles having voids" described below, a polymerization initiator, an antistatic agent, an antiglare agent, and the like) in a solvent is used as the composition of the low refractive index layer formation and a coating film is formed using the composition and the coating film is cured to form the low refractive index layer. The additives such as the polymerization initiator, the antistatic agent, an antiglare agent, and the like are not particularly limited and publicly known ones can be exemplified.

In the low refractive index layer, "fine particles having voids" are preferably used as a low refractive index agent. The "fine particles having voids" can reduce the refractive index of the low refractive index layer while maintaining layer strength of the layer. In the present invention, the term "fine particles having voids" means particles having a structure in which the inside of the particle is filled with gas and/or a porous structure including gas is formed, and a characteristic that the refractive index is decreased in inverse proportion to a gas occupancy in the fine particle compared with the particle's own refractive index. In the present invention, a fine particle, in which a nano porous structure can be formed inside the coat and/or in at least a part of the coat surface, based on the configuration, the structure and the agglomeration condition of the fine particles and the state of dispersed particles in a coat, is included. The refractive index of the low refractive index layer using this particle can be adjusted to a refractive index of 1.30 to 1.45.

Examples of inorganic fine particles having voids include silica fine particles prepared by a method described in Japanese Kokai Publication 2001-233611. Silica fine particles prepared by a production method described in Japanese Kokai Publication Hei-7-133105, Japanese Kokai Publication 2002-79616, and Japanese Kokai Publication 2006-106714, may be used. Since the silica fine particle having voids is easily produced and has high particle's own hardness, layer strength thereof is enhanced and it becomes possible to adjust the refractive index to a range of about 1.20 to 1.45 when the particles are mixed with the binder resin to form the low refractive index layer. Particularly, specific preferable examples of organic fine particles having voids include hollow polymer particles prepared by use of a technology disclosed in Japanese Kokai Publication 2002-80503.

Examples of the particle, in which a nano porous structure can be formed inside the coat and/or in at least a part of the coat surface, include a slow-release agent produced for the purpose of increasing a specific surface area, in which various chemical substances is adsorbed on a column for filling and a porous portion of the surface, porous particles used for fixing a catalyst, and dispersed substances or agglomerated substances of hollow particles for the purpose of incorporating in a heat insulating material or a low dielectric material in addition to the silica particles. Specifically, it is possible to select and use the particles within the range of the preferable particle diameter of the present invention from agglomerated substances of porous silica particles of commercially available Nipsil or Nipgel (both trade name) produced by Nihon silica kogyo corporation and colloidal silica UP series (trade name), having a structure in which silica particles are linked with one another in a chain form, produced by Nissan Chemical Industries, Ltd.

An average particle diameter of the "fine particles having voids" is 5 nm or more and 300 nm or less, and preferably, a lower limit is 8 nm and an upper limit is 100 nm, more preferably, a lower limit is 10 nm and an upper limit is 80 nm. It becomes possible to impart excellent transparency to the antiglare layer when the average particle diameter of the particles falls within this range. In addition, the average particle diameter is measured by a dynamic light-scattering method. An amount of the "fine particles having voids" is usually about 0.1 to 500 parts by weight with respect to 100 parts by weight of resins in the low refractive index layer, and preferably about 10 to 200 parts by weight.

The solvent is not particularly limited, examples thereof include those exemplified for the composition for hard coat layers, and preferable examples are methyl isobutyl ketone, cyclohexanone, isopropyl alcohol (IPA), n-butanol, tert-butanol, diethyl ketone, PGME, and the like.

A method for preparing the composition for low refractive index layers is a method for evenly mixing components, and the publicly known methods may be employed. Mixing may be carried out using, for example, the publicly known apparatus described in the hard coat layer formation.

A method for forming the coating film may be carried out in accordance with the publicly known method. For example, various methods described in the hard coat layer formation may be employed.

In forming the low refractive index layer, it is preferable to set the viscosity of the composition for low refractive index layers in a range of 0.5 to 5 cps (25° C.) where a preferable application property is attained, and preferably 0.7 to 3 cps (25° C.). An excellent antireflection film of visible light can be realized, a uniform thin film can be formed without producing irregularity of application, and a low refractive index layer having particularly excellent adhesion to the substrate can be formed.

A method for curing the obtained coating film may be properly selected in accordance with contents of the compositions. For example, in the case of ultraviolet curing type, ultraviolet rays may be radiated to the coating film to cure the film. In the case where heating means is employed for the curing treatment, it is preferable to add a thermal polymerization initiator for starting polymerization of the polymerizable compounds by generating radicals by heating.

A film thickness (nm) $d_A$ of the low refractive index layer preferably satisfies the following equation (I):

$$d_A = m\lambda/(4n_A) \tag{I}$$

wherein $n_A$ represents a refractive index of the low refractive index layer, m represents a positive odd, and preferably 1, $\lambda$ is a wavelength, and preferably values from 480 nm to 580 nm.

Further, in the present invention, it is preferable from the viewpoint of reducing a reflection factor that the low refractive index layer satisfies the following equation (II):

$$120 < n_A d_A < 145 \tag{II}$$

Antifouling Layer

The antifouling layer is a layer for preventing deposition of stains (fingerprints, water-based or oil-based inks, pencils, and the like) on the outermost layer of the optical layered body or making it easy to wipe out the stains even in the case of deposition. In a preferable embodiment of the present invention, a antifouling layer may be formed for preventing the stains on the outermost surface of the low refractive index layer and it is particularly preferable to form the layer on one face or both opposed faces of the light transmitting substrate bearing the low refractive index layer. Formation of the antifouling layer improves the antifouling property and the scratching resistance to the optical layered body (layered body for reflection prevention). In the case where there is no low refractive index layer, the antifouling layer may be formed for preventing the outermost surface stains.

The antifouling layer can be formed generally by using a composition containing an agent for the antifouling layer and a resin. Specific examples of the agent for the antifouling layer include fluoro compounds and/or silicon compounds which have poor compatibility with compositions containing the ionizing radiation-curable resins having fluorine atoms in each molecule and which are difficult to be added to the low refractive index layer; and fluoro compounds and/or silicon compounds which have compatibility with compositions containing the ionizing radiation-curable resins having fluorine atoms in each molecule and fine particles. Publicly known or commercialized compounds can be used.

The antifouling layer may be formed, for example, on the hard coat layer. Particularly, it is desirable to form the antifouling layer in a manner that the antifouling layer forms the outermost surface. The antifouling layer can be substituted with, for example, the hard coat layer by providing the antifouling property.

Interface of Optical Layered Body

The optical layered body of the present invention is desirable to have substantially no interface. Herein, the mean of "(substantially) no interface existing" may include 1) although two layer faces are overlapped, actually no interface exists and 2) no interface exists in both faces in terms of refractive indexes.

The optical layered body of the present invention is desirable to have substantially no interface. Herein, "(substantially) no interface existing" may include 1) although two layer faces are overlapped, actually no interface exists and 2) no interface exists in both faces in terms of refractive indexes.

Substantial determination standard of "(substantially) no interface existing" is based on observation of interference fringes. That is, a black tape is stuck to the rear face of the optical layered body and under radiation of light of a three wave fluorescent lamp, the optical layered body is observed with eyes from the top part. In this case, if interference fringes are observed, it can be confirmed that an interface can be observed separately by observation of a cross-section with a laser microscope and therefore, it is determined to be a proof of the "interface existence". On the other hand, if no interference fringe is extremely weakly observed or not, any interface can be observed to be extremely thin or not be observed and therefore, it is determined to be a proof of "(substantially) no interface existing". The laser microscope can read reflected light from respective interfaces and non-destructively observe the cross-section. That is because an interface is observed only in the case where there is refractive index difference between neighboring layers and in the case where no interface is observed, there is no refractive index difference and therefore, it is supposed that there is no interface.

Further, the optical layered body of the present invention can be used preferably as a layered body for reflection prevention.

Polarizer

A polarizer obtained by forming the optical layered body of the present invention on a polarizing element surface in a manner that a face opposed to the other face of the optical layered body where the hard coat layer exists is brought into contact with the surface is also one invention.

The polarizing element is not particularly limited and examples may include polyvinyl alcohol films, polyvinyl formal films, polyvinyl acetal films, ethylene-vinyl acetate copolymer type saponified films, and the like which are dyed with iodine or stretched.

In the lamination treatment of the polarizer and the optical layered body of the present invention, the light transmitting substrate (preferably triacetyl cellulose film) is preferably saponified. The saponification treatment improves the adhesion property and provides an antistatic property.

Other Antistatic Layers

In the case where more excellent antistatic properties are required, the optical layered body of the present invention may have at least one layer having an antistatic property besides the antistatic layer. The layer having the antistatic property may be a new antistatic layer other than the antistatic layer; however it is preferable to give the an antistatic property to another layer since process can be eliminated. That is,
in the optical layered body of the present invention, at least one layer among the hard coat layer and layers selected from the group consisting of the antiglare layer, low refractive index layer, and antifouling layer formed arbitrarily is preferable to have the antistatic property. The antistatic property can be provided by, for example, adding the antistatic agent.

Further, the polarizer of the present invention may have at least one antistatic layer other than the antistatic layer composing the optical layered body. It is sometimes required for the polarizer to solve a problem of destruction of a circuit of LCD panel or the like caused by generation of static electricity in production process. In this case, the antistatic layer is preferable to be formed on the polarizing element surface in the side where the optical layered body is not formed in order to solve such a problem.

The antistatic layer in the polarizer is not particularly limited if it has an antistatic property and may be formed similarly to the antistatic layer in the optical layered body. Examples of the antistatic agent to be preferably used include conductive polymers such as polyacetylene, polyaniline, polythiophene, polypyrrole, polyphenylene sulfide, poly(1,6-heptadiine), polybiphenylene (poly-p-phenylene), poly-p-phenylene sulfide, polyphenylacetylene, poly(2,5-thienylene) and their derivatives.

The antistatic layer in the polarizer has a thickness (dry thickness) preferably in a range of 10 nm to 500 nm and particularly 50 to 200 nm. The thickness of the antistatic layer is a value measured by observing the cross-section with an electron microscope (SEM, TEM, STEM).

The antistatic layer in the polarizer may be a single antistatic layer as described above and also an optical layered body including the antistatic layer. The optical layered body is not particularly limited if it contains an antistatic layer; however the optical layered body of the present invention may be preferably used.

As a specific example, after an optical layered body is produced by forming an antistatic layer 1 containing a conductive polymer on a light transmitting substrate and further forming a 6 μm-thick hard coat layer 1, an antistatic layer 2 containing a conductive polymer is formed on the opposed face to the face of the same light transmitting substrate where those two layers are formed and further a hard coat layer with a thickness of 2 μm, which is thinner than the hard coat layer 1, is formed to form an optical layered body. Alternatively, the antistatic layer 1 and the hard coat layer 1 are formed in the same manner on the light transmitting substrate, and successively a hard coat ink containing dispersed ATO, conductive ultrafine particles, is applied to the opposed face of the same substrate to form an antistatic layer 3 and thus an optical layered body 2 may be produced. In the case of the optical layered body 1, the face where the antistatic layer 2 is formed and in the case of the optical layered body 2, the face of the antistatic layer 3 are stuck to the polarizing elements with an acrylic adhesive.

Image Display Devices

The present invention also provides an image display device including the optical layered body or the polarizer at the outermost surfaces. The image display device may be a non-self-luminous image display device such as LCD, or may be a self-luminous image display device such as PDP, FED, ELD (organic EL, inorganic EL) and CRT.

The LCD, which is a typical example of the non-self-luminous type, includes a light-transmitting display and a light source apparatus to irradiate the light-transmitting display from the backside. When the image display device is an LCD, the optical layered body of the present invention or the polarizer of the present invention is formed on the surface of this light-transmitting display.

When the present invention provides a liquid crystal display device having the optical layered body, a light source of the light source apparatus irradiates from the under side of the optical layered body. In addition, in the SNT type liquid crystal display device, a retardation plate may be inserted between a liquid crystal display element and the polarizer. An adhesive layer may be provided between the respective layers of this liquid crystal display device as required.

The PDP, which is the self-luminous image display device, includes a surface glass substrate (electrode is formed on the surface) and a backside glass substrate which is located at a position opposite to the surface glass substrate (an electrode and fine grooves are formed in the surface and red-, green-, and blue-phosphor layers are formed in the grooves) with a discharge gas filled between these substrates. When the image display device of the present invention is a PDP, the PDP includes the optical layered body described above on the surface of the surface glass substrate or a front plate (glass substrate or film substrate) thereof.

The self-luminous image display device may be an ELD apparatus in which luminous substances of zinc sulfide or diamines materials to emit light through the application of a voltage are deposited on a glass substrate by vapor deposition and display is performed by controlling a voltage to be applied to the substrate, or image display devices such as CRT, which converts electric signals to light to generate visible images. In this case, the image display device includes the optical layered body described above on the outermost surface of each of the display devices or on the surface a front plate thereof.

The image display device of the present invention can be used for displays such as televisions, computers, and word processors in any case. Particularly, it can be suitably used for the surfaces of displays for high-resolution images such as CRTs, liquid crystal panels, PDPs, ELDs and FEDs.

EFFECTS OF THE INVENTION

The optical layered body of the present invention keeps transparency, stably exhibits the antistatic property, and suppresses rust generation in a coater at the time of production. Accordingly, the optical layered body of the present invention can be preferably used for a cathode-ray tube (CRT) display device, a liquid crystal display (LCD), a plasma display (PDP), an electroluminescence display (ELD), and the like.

BEST MODE FOR CARRYING OUT THE INVENTION

Hereinafter, the present invention will be described more in detail with reference to Examples and Comparative Examples; however it is not intended that the present invention be limited to the illustrated Examples.

Preparation Example 1

Composition 1 for Hard Coat Layers
The following components were evenly mixed and dispersed to prepare a composition 1 for hard coat layers.
Pentaerythritol triacrylate (trade name "PET 30", produced by Nippon Kayaku Co., Ltd.): 100 parts by weight
Toluene: 43 parts by weight
Leveling agent (trade name "MCF-350-5", produced by Dainippon Ink and Chemicals, Inc): 2 parts by weight
Polymerization initiator (trade name "Irgacure 184", produced by Ciba Specialty Chemicals Inc.): 4 parts by weight
Composition 2 for Hard Coat Layers
The following components were evenly mixed and dispersed to prepare a composition 2 for hard coat layers.
Pentaerythritol triacrylate (trade name "PET 30", produced by Nippon Kayaku Co., Ltd.): 100 parts by weight
Methyl ethyl ketone: 43 parts by weight
Leveling agent (trade name "MCF-350-5", produced by Dainippon Ink and Chemicals, Inc): 2 parts by weight
Polymerization initiator (trade name "Irgacure 184", produced by Ciba Specialty Chemicals Inc.): 4 parts by weight
Composition 3 for Hard Coat Layers
The following components were evenly mixed and dispersed by a bead mill to prepare a composition 3 for hard coat layers.
ATO ultrafine particles (average primary particle diameter: 30 nm, produced by Mitsubishi Materials Corp.): 7 parts by weight
Pentaerythritol triacrylate (trade name "PET 30", produced by Nippon Kayaku Co., Ltd.): 100 parts by weight
Dispersant (Ajisper PN-411, produced by Ajinomoto Co., Inc.): 1.4 parts by weight
Isopropyl alcohol: 60 parts by weight
Methyl ethyl ketone: 40 parts by weight
Polymerization initiator (trade name "Irgacure 184", produced by Ciba Specialty Chemicals Inc.): 4 parts by weight
Composition 1 for Antiglare Layers
A composition was prepared by sufficiently mixing 20.96 parts by weight of pentaerythritol acrylate (PETA), an ultraviolet curable resin (refractive index 1.51, produced by Nippon Kayaku Co., Ltd.); 8.02 parts by weight of DPHA, an ultraviolet curable resin (refractive index 1.51, produced by Nippon Kayaku Co., Ltd.); 3.10 parts by weight of an acrylic polymer (molecular weight 75000, produced by Mitsubishi Rayon Co., Ltd.); 1.89 parts by weight of Irgacure 184, a photo-curing initiator (produced by Ciba Specialty Chemicals Inc.); 0.32 part by weight of Irgacure 907, a photo-curing initiator (produced by Ciba Specialty Chemicals Inc.); 4.81 parts by weight of styrene beads as the first light transmissive fine particles (particle diameter 5.0 μm, refractive index 1.60, produced by Soken Chemical & Engineering Co.); 2.89 parts by weight of melamine beads as the second light transmissive fine particles (particle diameter 1.8 μm, refractive index 1.68, produced by Nippon Shokubai); 0.013 part by weight of a silicon leveling agent 10-28 (from Dainichiseika Color & Chemicals Mfg.); 46.40 parts by weight of toluene; and 11.60 parts by weight of cyclohexanone. The composition was filtered with a filter made of polypropylene and having pore diameter of 30 μm to obtain a composition 1 for antiglare layers.
Composition 2 for Antiglare Layers
Composition for Antiglare Layer
Pentaerythritol triacrylate (PETA) (refractive index 1.51): 38 parts by weight
Cellulose acetate propionate (molecular weight 50000): 0.47 part by weight
Photo-Curing Initiator
Irgacure 127 (produced by Ciba Specialty Chemicals Inc.): 1.98 parts by weight
Sensitizer
Speedcure MBB (produced by LAMBSON Fine Chemicals): 0.33 part by weight
Fine Particles
Nonspherical silica (average particle diameter 1.4 μm, surface-hydrophobic treatment done with a silane coupling agent): 0.20 part by weight Nonspherical silica (average particle diameter 1.9 μm, surface-hydrophobic treatment done with a silane coupling agent): 3.46 parts by weight
Silicon leveling agent: 0.072 part by weight
Toluene: 33 parts by weight
Methyl ethyl ketone: 34 parts by weight
Conductive Composition
ATO ultrafine particles (average primary particle diameter: 30 nm, produced by Mitsubishi Materials Corp.): 2 parts by weight
Dispersant (Ajisper PN-411, produced by Ajinomoto Co., Inc.): 0.2 part by weight
Isopropyl alcohol: 4 parts by weight
The conductive composition was sufficiently dispersed by a bead mill and mixed with the composition for antiglare layers. The resulting composition was filtered by a filter made of polypropylene and having a pore diameter of 30 μm to obtain a composition 2 for antiglare layers.
Composition 1 for Antistatic Layers
The following components were evenly mixed and dispersed to prepare the composition 1 for antistatic layers.
ATO dispersion (trade name "Peltron C-4456S-7", produced by Nippon Pelnox Corporation): 25 parts by weight
Binder (trade name "SR-238F", produced by Sartomar Company) 5.5 parts by weight
Polymerization initiator (trade name "Irgacure 184", produced by Ciba Specialty Chemicals Inc.): 0.59 part by weight
Methyl isobutyl ketone: 59 parts by weight
Cyclohexanone: 26 parts by weight
Composition 2 for Antistatic Layers
As a composition 2 for antistatic layers, a polythiophene-containing heat drying resin composition (trade name "EL Coat TALP 2010, produced by Idemitsu Technofine Co., Ltd.) was used. The composition contains poly(3,4-ethylenedioxythiophene) as an antistatic agent and MMA (methyl methacrylate)-BA (butyl acrylate)-2-HEMA (2-hydroxyethyl methacrylate) copolymer as a thermoplastic resin binder.
Composition 3 for Antistatic Layers
As a composition 3 for antistatic layers, a polythiophene-containing ultraviolet-curable resin composition (trade name "EL Coat UVH 515, produced by Idemitsu Technofine Co., Ltd.) was used. The composition contains poly(3,4-ethylenedioxythiophene) as an antistatic agent and an acrylic UV-curable resin as a resin binder.

Example 1

A transparent substrate (thickness 80 μm, a triacetyl cellulose resin film (trade name "TF80UL", produced by Fuji Photo Film Co., Ltd.) was prepared and the composition 2 for antistatic layers was applied to one face of the film by a coil type coating rod and kept in a heating oven at a temperature of 50° C. for 30 seconds to evaporate the solvent in the coating film, and thus cured the coating film to form a transparent antistatic layer with a thickness of about 100 nm (after drying) Thereafter, the composition 1 for hard coat layers was applied to the antistatic layer and kept in a heating oven at a temperature of 70° C. for 30 seconds to evaporate the solvent in the coating film. Thereafter, ultraviolet rays were radiated in an integrated light quantity of 46 mj to cure the coating film and thus form a hard coat layer with a thickness of 10 μm (in a dry state) and accordingly produce an antistatic optical layered body.
A cross-section of the obtained layered body was observed at 100000 magnification with a transmission electron microscope (TEM) (JEM-200X type, produced by LEOL). The result is shown in FIG. 1. As being made clear from FIG. 1, it can be understood that the cross-section (vertical stripe pattern) of the hard coat layer penetrates (enters in) a portion of the substrate through the polythiophene layer (antistatic layer: black layer).

Example 2

An antistatic optical layered body was produced in the same manner as in Example 1, except that the composition 2 for hard coat layers was used in place of the composition 1 for hard coat layers. When a cross-section of the obtained layered body was observed in the same manner as in Example 1, it was confirmed that the cross-section phase of the hard coat layer existed in the cross-section of the substrate layer similarly to Example 1: that is, the portion where the hard coat layer components supposed to penetrate the substrate existed. (The thickness of the antistatic layer after drying was 100 nm).

Example 3

An antistatic optical layered body was produced in the same manner as in Example 1, except that the composition 1 for antiglare layers was used in place of the composition 1 for hard coat layers and the cured coating film thickness was changed to be 6 μm. (The thickness of the antistatic layer after drying was 100 nm).

Comparative Example 1

A transparent substrate (thickness 80 μm, a triacetyl cellulose resin film (trade name "TF80UL", produced by Fuji Photo Film Co., Ltd.) was prepared and the composition 1 for antistatic layers was applied to one face of the film by a coil type coating rod and kept in a heating oven at a temperature of 70° C. for 30 seconds to evaporate the solvent in the coating film and thereafter, to prevent oxygen inhibition, nitrogen replacement was carried out. After that, ultraviolet rays were radiated in an integrated light quantity of 98 mj to cure the coating film and thus form a transparent antistatic layer with a thickness of 100 nm (in a dry state). After that, the composition 1 for hard coat layers was applied to the antistatic layer and kept in a heating oven at a temperature of 70° C. for 30 seconds to evaporate the solvent in the coating film. Thereafter, ultraviolet rays were radiated in an integrated light quantity of 46 mj to cure the coating film and thus form a hard coat layer with a thickness of 10 μm (in a dry state) and accordingly produce an antistatic optical layered body.
A cross-section of the obtained layered body was observed in the same manner as in Example 1 and the result is show in FIG. 2. In FIG. 2, it is confirmed that the cross-sectional phases of the respective layers exist in the order of the layer configuration. That is, no cross-section phase other than the above-mentioned phases is observed in the cross-section phased of the substrate. Further, since the ultrafine particle dispersion type antistatic composition was used; the haze was high, the total luminance transmittance was low, and the saturated charge voltage was inferior in the case where the thickness (100 mm) was the same as that of polythiophene and thus no desired optical layered body was obtained.

Comparative Example 2

A layered body was produced in the same manner as in Comparative Example 1, except that the composition 3 for antistatic layers was used in place of the composition 1 for antistatic layers, the cured film was formed to have a thickness of about 100 nm, and the composition 2 for hard coat layers was used. When a cross-section of the obtained layered body was observed in the same manner as in Example 1, the cross-section was the same as shown in FIG. 2. That is, since the binder is an ultraviolet curable, no cross-section phase of the hard coat layer was observed in the cross-section phase of the substrate and thus the adhesion property was inferior. (The thickness of the antistatic layer after drying was 100 nm).

Comparative Example 3

A layered body was produced in the same manner as in Comparative Example 2, except that the composition 3 for antistatic layers was used and the composition 1 for hard coat layers was used. When a cross-section of the obtained layered body was observed in the same manner as in Example 1, the cross-section was the same as shown in FIG. 2. That is, since the binder is an ultraviolet curable, no cross-section phase of the hard coat layer was observed in the cross-section phase of the substrate and thus the adhesion property was inferior. (The thickness of the antistatic layer after drying was 100 nm)

Comparative Example 4

A layered body was produced in the same manner as in Comparative Example 1, except that the composition 1 for antiglare layers was used in place of the composition 1 for hard coat layers and the cured film thickness was changed to be 6 μm. Consequently, since the antiglare hard coat same as that of Example 3 was used, except the antistatic composition, the same functions should be obtained; however since the antistatic composition of ultrafine particle dispersion type was used, the haze was high and total luminance transmittance was low and thus no desired optical layered body was obtained. (The thickness of the antistatic layer after drying was 100 nm).

Example 4

An antistatic optical layered body was produced in the same manner as in Example 1, except that the composition 3 for hard coat layers was used in place of the composition 1 for hard coat layers. When a cross-section of the obtained layered body was observed in the same manner as in Example 1, it was confirmed that the cross-section phase of the hard coat layer existed in the cross-section of the substrate layer similarly to Example 1: that is, the portion where the hard coat layer composition components supposed to penetrate the substrate existed. (The thickness of the antistatic layer after drying was 100 nm).

Example 5

An antistatic optical layered body was produced in the same manner as in Example 1, except that the composition 2 for antiglare layers was used in place of the composition 1 for hard coat layers. When a cross-section of the obtained layered body was observed in the same manner as in Example 1, it was confirmed that the cross-section phase of the hard coat layer existed in the cross-section of the substrate layer similarly to Example 1: that is, the portion where the hard coat layer components supposed to penetrate the substrate existed. (The thickness of the antistatic layer after drying was 100 nm).

Experiment Example 1

The optical layered bodies obtained in Examples and Comparative Examples were subjected to the following respective evaluation experiments.

The results are shown in Table 1.

TABLE 1

| | AS type | Binder of AS layer | Diluting solvent for HC or AG layer | Total luminance transmittance | Haze | Saturated charge voltage after HC or AG re-coating | Adhesion property | Appearance in the case of re-coating |
|---|---|---|---|---|---|---|---|---|
| Example 1 | Poly(3,4-ethylene dioxythiophene) | Thermoplastic resin | Toluene | 91.5 | 0.2 | 1.7 kV | 100/100 | good |
| Example 2 | | | MEK | 91.6 | 0.2 | 1.7 kV | 100/100 | good |
| Example 3 | | | Toluene/Cyclohexanone | 90.8 | 54.8 | 1.7 kV | 100/100 | good |
| Example 4* | | | MEK/Isopropyl alcohol | 91.3 | 0.5 | 0.8 kV | 100/100 | good |
| Example 5** | | | Toluene/MEK/Isopropyl alcohol | 90.7 | 55.0 | 0.6 kV | 100/100 | good |
| Comparative Example 1 | ATO | Ultraviolet curable resin | MIBK/Cyclohexanone | 90.5 | 0.8 | 2.2 kV | 100/100 | good |
| Comparative Example 2 | Poly(3,4-ethylene dioxythiophene) | | MEK | 91.6 | 0.3 | 1.7 kV | 0/100 | film separation |
| Comparative Example 3 | | | Toluene | 91.5 | 0.2 | 1.7 kV | 0/100 | film separation |
| Comparative Example 4 | ATO | | Toluene/Cyclohexanone | 88.3 | 56 | 1.7 kV | 100/100 | good |

*Example 4; AS type: The main AS type is poly(3,4-ethylene dioxythiophene), and HC layer contains ATO.
**Example 5; AS type: The main AS type is poly(3,4-ethylene dioxythiophene), and AG layer contains ATO.

The respective physical properties in Table 1 were measured by the following methods.

Total luminance transmittance (JIS K 7361): Total luminance transmittance(%) was measured by a haze meter (production No.: HM-150, produced by Murakami Color Research Laboratory). The total luminance transmittance is preferable to be 85% or higher for a clear hard coat or a hard coat having antiglare property. In the present invention, it can be kept at about 90% or higher in the case of a clear hard coat.

Haze value (JIS K 7136): The haze value (%) was measured by a haze meter (production No.: HM-150, produced by Murakami Color Research Laboratory). In the case of a clear hard coat containing no bead for an antiglare layer, 0.3 or lower is qualified.

Saturated charge voltage: The saturated charge voltage was measured for a film (4 cm×4 cm square) in condition of application voltage of +10 kV, 25±2° C., 50±10% RH, and distance of 20 mm from the film by using static honestometer (H-0110, produced by Shishido Electrostatic Ltd.). In the case of a normal hard coat having no antistatic layer, the saturated charge voltage becomes about 2.5 kV. In the present invention, it is preferable to be less than 2.0 kV (particularly 1.9 kV or lower).

Coating adhesion property (JIS K 5600): Lattice of 1 mm square was formed and peeling was carried out once using a 24 mm Cello tape (registered trade name) produced by Nichiban Co., Ltd. and the number of remaining meshes was expressed by %. In this test, 100/100 is qualified and others are not qualified. In the case where the binder of the antistatic layer (AS layer) was an ultraviolet curable type, any could not be qualified and if the thickness exceeded the preferred range, any could not be qualified.

Appearance in the case of re-coating (re-coat): The film after application of a composition for hard coat layers or a composition for antiglare layers was observed with eyes to confirm film separation (foreign matter) of an antistatic layer by re-coating by eye observation. Since the film separation occurred by application in the case where the film strength was weak, it could be easily confirmed with eyes. The coating film adhesion greatly affected in this observation. The appearance and the adhesion are very important properties for good appearance for display images.

Reference Example 1

Hard Coat Layer/As Layer/TAC/Adhesive Layer/Polarizing Element/Adhesive Layer/TAC/AS Layer/Transparent Adhesive Material/Protection Film Stuck to the Transparent Adhesive Material A transparent substrate (thickness 80 μm, a triacetyl cellulose resin film, trade name "TF80UL", produced by Fuji Photo Film Co., Ltd.) was prepared and the composition 2 for antistatic layers was applied to one face of the film by a coil type coating rod and kept in a heating oven at a temperature of 50° C. for 30 seconds to evaporate the solvent in the coating film and thus cured the coating film to form a transparent antistatic layer with a thickness of about 100 nm (after drying) Thereafter, the composition 1 for hard coat layers was applied to the antistatic layer and kept in a heating oven at a temperature of 70° C. for 30 seconds to evaporate the solvent in the coating film and thereafter, ultraviolet rays were radiated in an integrated light quantity of 46 mj/m$^2$ to cure the coating film and thus form a hard coat layer with a thickness of 10 μm (in a dry state) and accordingly produce an antistatic optical layered body.

Further, similarly, the composition 2 for antistatic layers was applied to one face of a triacetyl cellulose resin film and dried and a transparent adhesive material (e.g. DA-1000 produced by Hitachi Chemical Co., Ltd.: acrylic adhesive for optical films coated with a protection film in both sides) was stuck to the formed antistatic layer to produce an antistatic layer-coated body.

The antistatic optical layered body was immersed in an aqueous potassium hydroxide solution (concentration 2 mol/L) at 40° C. for 5 minutes for saponification treatment and washed with pure water and thereafter dried at 70° C. for 5 minutes. Further, the antistatic layer-coated body was treated by saponification treatment in the same manner and dried. After an adhesive in the form of an aqueous solution of 7% polyvinyl alcohol was applied to faces of those saponified two triacetyl cellulose resin films and then the films were stuck while sandwiching a polyvinyl alcohol polarization film between them to produce a polarizer 1.

Reference Example 2

Example of Liquid Crystal Display Device Having Three as Layers)

Polarizer 1
hard coat layer/AS layer/TAC/adhesive layer/polarizing element/adhesive layer/TAC/AS layer/transparent adhesive material/protection film (stuck to the transparent adhesive material)
Polarizer 2
protection film (stuck to the transparent adhesive material)/transparent adhesive material/AS layer/TAC/adhesive layer/polarizing element/adhesive layer/TAC The polarizer 1 was produced in the same manner as in Reference Example 1. Next, after an antistatic layer-coated body was formed in the same manner as in Reference Example 1, the obtained antistatic layer-coated body and an untreated triacetyl cellulose resin film were subjected to saponification treatment and thereafter, an adhesive in the form of an aqueous solution of 7% polyvinyl alcohol was applied and then the films were stuck while sandwiching a polyvinyl alcohol polarization film between them to produce a polarizer 2.

Finally, the polarizer 1 and the polarizer 2 were stuck with the transparent adhesive material from which the protection film was removed in a manner that the liquid crystal cells were sandwiched between them to produce a liquid crystal display device 1. Without disordering the liquid crystal layer, a high quality liquid crystal display device was obtained.

Reference Example 3

Production Example of Polarizer Having One AS Layer (hard coat layer/AS layer/TAC/adhesive layer/polarizing element/adhesive layer/TAC/transparent adhesive material/protection film (stuck to the transparent adhesive material))

A polarizer 3 was produced in the same manner as in Reference Example 1, except that no antistatic layer was formed in the antistatic layer-coated body.

Reference Example 4

Production Example of Polarizer Having One AS Layer (hard coat layer/TAC/adhesive layer/polarizing element/adhesive layer/TAC/AS layer/hard coat layer/transparent adhesive material/protection film (stuck to the transparent adhesive material))

An optical layered body was produced in the same manner as in Reference Example 1, except that no antistatic layer was formed in TAC surface which was set in the image display device observation side.

An AS layer and a hard coat layer were formed in the other TAC for sandwiching the polarizing element in the same manner as the antistatic optical layered body of as Reference Example 1 to obtain an antistatic optical layered body. However, being different from Reference Example 1, the thickness of the hard coat layer (in a dry state) was changed to 1.5 μm. The antistatic property of a LCD panel can be improved by making the hard coat layer thin as described and therefore, it is preferable. A polarizer 4 was produce in the same manner as in Reference Example 1, except the difference described above.

Reference Example 5

Example of Liquid Crystal Display Devices Having One as Layer

Polarizer 3
hard coat layer/AS layer/TAC/adhesive layer/polarizing element/adhesive layer/TAC/transparent adhesive material/protection film (stuck to the transparent adhesive material)
Polarizer 5
protection film (stuck to the transparent adhesive material)/transparent adhesive material/TAC/adhesive layer/polarizing element/adhesive layer/TAC The polarizer 3 was produced in the same manner as in Reference Example 3. Next, after a triacetyl cellulose resin film to which the transparent adhesive material was stuck and an untreated triacetyl cellulose resin film were subjected to saponification treatment, an adhesive in the form of an aqueous solution of 7% polyvinyl alcohol was applied and then the films were stuck while sandwiching a polyvinyl alcohol polarization film between them to produce a polarizer 5.

Finally, the polarizer 3 and the polarizer 5 were stuck with the transparent adhesive material from which the protection film was removed in a manner that the liquid crystal cells were sandwiched between them to produce a liquid crystal display device 2. As compared with the liquid crystal display device 1 having three AS layers as described in Reference Example 2, in the case where the AS layer was a single layer, the antistatic property was found decreasing and accordingly it can be understood that a better antistatic property can be obtained if there is more AS layers.

In production process of the polarizer and the liquid crystal display device, interlayer separation among the respective constituent layers did not occur and accordingly it can be understood that a high adhesion property is maintained.

The polarizers 1 to 4 were wiped with a polyester cloth reciprocally 20 times and tobacco ashes were set closer to the wiped surfaces, and the surface states were observed. The dust deposition preventive function (antistatic property) was evaluated according to the following standard, on the basis of the observation results.
evaluation good: no tobacco ash deposited and the dust deposition preventive function was sufficient.
evaluation poor: tobacco ashes were deposited and the dust deposition preventive function was insufficient.
The results are shown in Table 2.

TABLE 2

| Polarizer | Dust deposition preventive property |
|---|---|
| Polarizer 1 | good |
| Polarizer 2 | poor |
| Polarizer 3 | poor |
| Polarizer 4 | poor |

As a result, the polarizer having an antistatic layer other than the antistatic layers contained in the optical layered bodies were found particularly excellent in the dust deposition preventive function.

INDUSTRIAL APPLICABILITY

The present invention provides an optical layered body having both excellent antistatic property and adhesion and a method for producing the same. The optical layered body of the present invention is preferably usable for a cathode-ray tube (CRT) display device, a liquid crystal display (LCD), a plasma display (PDP), an electroluminescence display (ELD), a FED and a ELD.

BRIEF DESCRIPTIONS OF THE DRAWINGS

FIG. 1 is a drawing showing the results of the observation of the cross-section of the optical layered body produced in Example 1 by TEM.
FIG. 2 is a drawing showing the results of the observation of the cross-section of the optical layered body produced in Comparative Example 3 by TEM.

The invention claimed is:
1. An optical layered body comprising
an antistatic layer and a hard coat layer formed in sequence on a light transmitting substrate,
wherein in the cross-sectional appearance of the layered body, the cross-section phase (cut patterns) of the hard coat layer exists in the region of the light transmitting substrate via the antistatic layer from the hard coat layer: and
wherein the hard coat layer is formed on the antistatic layer.
2. The optical layered body according to claim 1,
wherein the antistatic layer is formed from a heat drying composition containing an antistatic agent and a thermoplastic resin.
3. The optical layered body according to claim 2,
wherein the antistatic agent is at least one conductive polymer selected from polyacetylene, polyaniline, polythiophene, polypyrrole, polyphenylene sulfide, poly(1, 6-heptadiine), polybiphenylene (poly-p-phenylene), poly-p-phenylene sulfide, polyphenylacetylene, polyfuran, poly(3,4-ethylenedioxythiophene), polyisothianaphthene, polyacene, and their derivatives.
4. The optical layered body according to claim 1,
wherein the thickness of the antistatic layer is 10 to 500 nm.
5. The optical layered body according to claim 2,
wherein the hard coat layer is formed from a composition for hard coat layers containing a resin and a solvent, and the solvent has solubility for the thermoplastic resin of the antistatic layer.
6. The optical layered body according to claim 1,
wherein at least one layer selected from the group consisting of an antiglare layer, a low refractive index layer, and an antifouling layer is formed on the hard coat layer.
7. The optical layered body according to claim 1,
wherein at least one layer among the hard coat layer and layers selected from the group consisting of the antiglare layer, low refractive index layer, and antifouling layer has an antistatic property.
8. The optical layered body according to claim 1,
which is used as an antireflection layered body.
9. A polarizer comprising a polarizing element,
the polarizer includes the optical layered body according to claim 1 on a surface of the polarizing element.
10. The polarizer according to claim 9, comprising
an antistatic layer other than the antistatic layer included in the optical layered body.

11. A method for producing an optical layered body comprising an antistatic layer and a hard coat layer formed in sequence on a light transmitting substrate,
wherein the antistatic layer is formed from a heat drying composition containing an antistatic agent and a thermoplastic resin;
the hard coat layer is formed from a composition for hard coat layers containing a resin and a solvent; and
the solvent has solubility for the thermoplastic resin of the antistatic layer.

12. The optical layered body according to claim 2, wherein the thickness of the antistatic layer is 10 to 500 nm.

13. The optical layered body according to claim 3, wherein the thickness of the antistatic layer is 10 to 500 nm.

14. The optical layered body according to claim 2, wherein the hard coat layer is formed from a composition for hard coat layers containing a resin and a solvent, and the solvent has solubility for the thermoplastic resin of the antistatic layer.

15. The optical layered body according to claim 3, wherein the hard coat layer is formed from a composition for hard coat layers containing a resin and a solvent, and the solvent has solubility for the thermoplastic resin of the antistatic layer.

* * * * *

UNITED STATES PATENT AND TRADEMARK OFFICE
CERTIFICATE OF CORRECTION

PATENT NO. : 8,076,446 B2
APPLICATION NO. : 12/295025
DATED : December 13, 2011
INVENTOR(S) : Masataka Nakashima et al.

It is certified that error appears in the above-identified patent and that said Letters Patent is hereby corrected as shown below:

Claim 9, at column 30, line 63, amend "the polarizer" to read "wherein the polarizer".

Signed and Sealed this
Sixth Day of March, 2012

David J. Kappos
*Director of the United States Patent and Trademark Office*